United States Patent [19]
Kolmer

[11] Patent Number: 5,956,078
[45] Date of Patent: Sep. 21, 1999

[54] METHOD AND APPARATUS FOR READING DATA FROM A PRINTED SURFACE OF HEADS IN A HEAD STACK ASSEMBLY

[75] Inventor: William Robert Kolmer, Savage, Minn.

[73] Assignee: Seagate Technology, Inc., Scotts Valley, Calif.

[21] Appl. No.: 08/811,516

[22] Filed: Mar. 4, 1997

[51] Int. Cl.⁶ .................................................. H04N 7/18
[52] U.S. Cl. ............................................. 348/86; 348/87
[58] Field of Search ..................................... 360/104, 110, 360/103; 382/147, 149, 152, 151, 141; 348/87, 86, 92, 95, 91, 126; 29/603.1, 603.15

[56] References Cited

U.S. PATENT DOCUMENTS

| | | | |
|---|---|---|---|
| 5,157,735 | 10/1992 | Maeda et al. .............................. | 348/91 |
| 5,187,626 | 2/1993 | Hopkins et al. .......................... | 360/104 |
| 5,752,309 | 5/1998 | Partee et al. ........................... | 29/603.18 |
| 5,759,428 | 6/1998 | Balamane et al. ................... | 29/603.07 |
| 5,805,284 | 9/1998 | Lacey ........................................ | 356/357 |

*Primary Examiner*—Anand S. Rao
*Attorney, Agent, or Firm*—Westman, Champlin & Kelly, P.A.

[57] ABSTRACT

An apparatus and method for reading printed data from heads of an assembled head stack assembly of a disc drive. The assembly and method of the present invention include an image detection assembly having a camera for reading an optical image of the printed data from printed surfaces of heads in the head stack assembly and a reflection device aligned relative to the printed surfaces and camera to direct an optical image of the printed surface of the head to the camera. The assembly also includes an output device coupled to the camera for outputting the printed data.

23 Claims, 9 Drawing Sheets

HEAD STACK ASSEMBLY NO. 97A65
   HEAD 1 NO. A6B439724
   HEAD 2 NO.
   HEAD 3 NO.
   HEAD 4 NO.
   HEAD 5 NO.
   HEAD 6 NO.
HEAD STACK ASSEMBLY NO. 6843A
   HEAD 1 NO. . . . .

Fig. 4B

METHOD AND APPARATUS FOR READING DATA FROM A PRINTED SURFACE OF HEADS IN A HEAD STACK ASSEMBLY

BACKGROUND OF THE INVENTION

The present invention relates to a method and apparatus for reading printed data from a head in a head stack assembly of a disc drive. In particular, the present invention relates to a method and apparatus for reading and recording printed alphanumeric data (e.g. a serial number or part identification number) applied to a head in a head stack assembly.

A head stack assembly of a disc drive supports a plurality of heads for selectively positioning the heads relative to selected data tracks on magnetic discs for reading information from and writing information to the magnetic discs. The head stack assembly is movably supported relative to the magnetic discs for selectively aligning the heads of the head stack assembly over a selected group of data track(s) (or cylinders) on the discs.

Each head in the head stack assembly includes a slider which supports a transducer for reading and writing data on the magnetic discs. The slider includes a leading end and a trailing end. The transducers are typically positioned at a trailing end of the slider. During manufacture, alphanumeric data (e.g., serial or part number) is printed (typically laser etched) on the leading end of the slider. This alphanumeric data is used to track and record manufacturing data, such as lot number, manufacture date(s), and plant of assembly for the heads.

The alphanumeric data etched on a printed surface of a slider may be read from individual heads prior to assembly of the head stack. It is also desirable to read alphanumeric data from a printed surface of the heads of an assembled head stack assembly. The data has, in the past, been read manually by aligning the printed surface of each head with a microscope or other magnification device. Since the printed surface is on a leading end of the slider, it is difficult to align the head stack assembly so that the printed surface of the heads may be read.

In particular, in order to read or decipher the data on the printed surface, it is necessary to precisely orient the head stack assembly so that the data on the printed surface is visible by the magnification device. This process can be difficult and time consuming since each head must be precisely aligned relative to the magnification device so that the printed data is visible to the magnification device. It also may be necessary to focus individual portions of the alphanumeric data separately in order to compile and record the entire part identification or serial number for each individual head since it may not be possible to view (under magnification) the entire printed surface of a head at once. Repeat handling of the head stack assembly during this process of reading information from the heads may cause damage and wear to the heads and the head stack assembly.

Thus, the method of individually aligning and focusing the printed surface of each head in the head stack assembly to read printed data is time consuming and expensive, and may cause damage to the head stack assembly.

SUMMARY OF THE INVENTION

The system of the present invention reads printed data from a printed surface of a head in an assembled head stack assembly. The system includes an image detection assembly for reading the data from the printed surface of the heads in the head stack assembly and an output device coupled to the image detection assembly to output the data.

In one preferred embodiment, the image detection assembly includes a reflection device for reflecting an optical image from the printed surface of a head in a supported head stack assembly and a camera for detecting the reflected optical image of the printed data. The reflection device is aligned relative to the printed surface of a head in the supported head stack assembly so that an optical image of the printed surface is directed to the reflection device. The reflection device is similarly aligned relative to the camera to reflect the optical image of the printed surface of the head to the camera so that the image of the printed surface can be processed for output. Thus, the device of the present invention provides a system for reading information from printed surfaces of heads on an assembled head stack assembly.

DETAILED DESCRIPTION OF THE PREFERRED EMBODIMENTS

Figure 1:
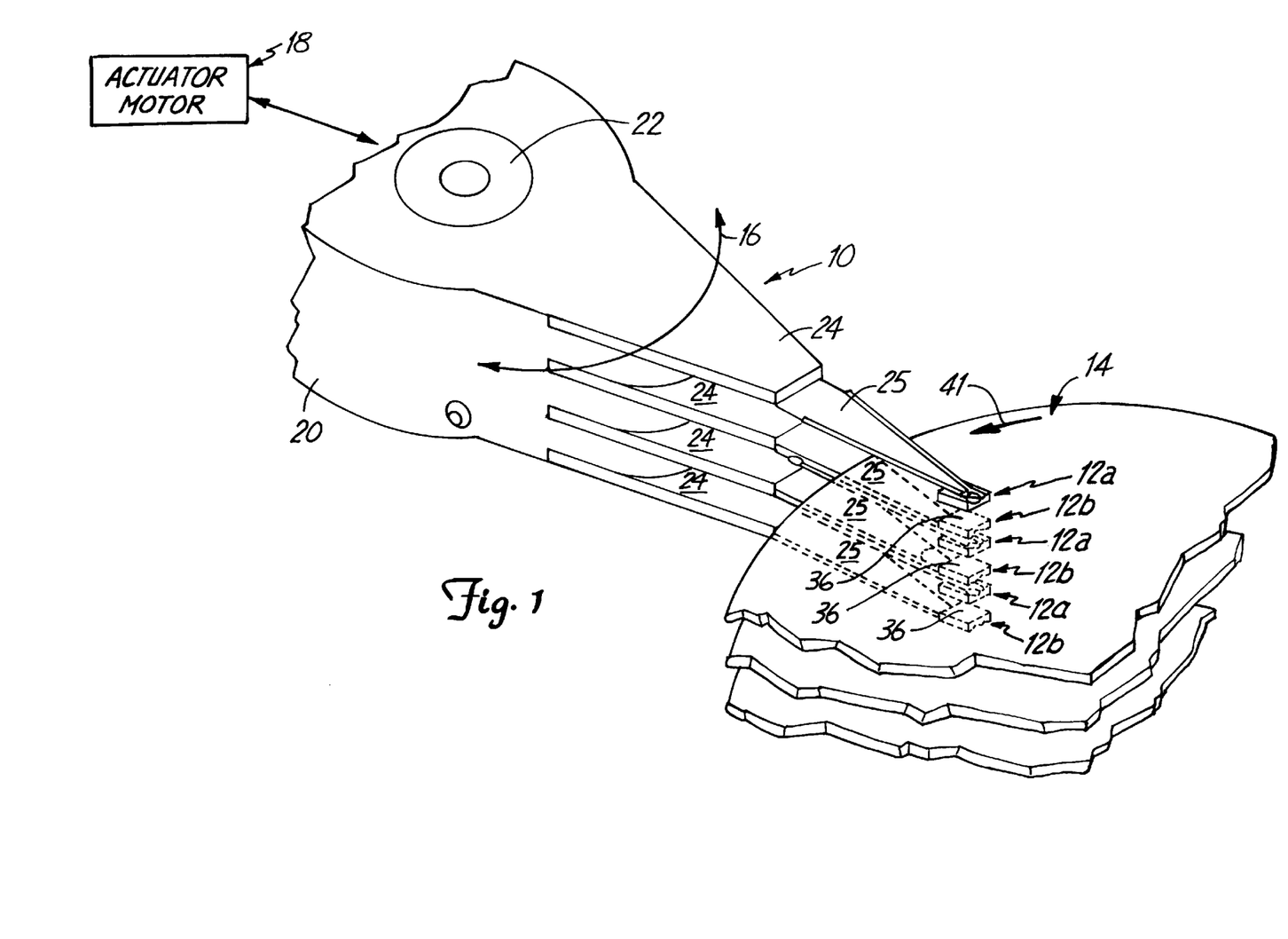
FIG. 1 is a perspective view of a rotatably actuated head stack assembly of a hard disc drive (not shown), with an actuator motor shown diagrammatically.

The present invention relates to a method and apparatus for reading printed alphanumeric data (such as a serial number or part identification number) from a head in a head stack assembly. FIG. 1 is a perspective view illustrating a head stack assembly 10 of a disc drive (not shown) supporting a plurality of heads 12. Heads 12 are used to read and write information to magnetic discs 14 (shown in phantom). The head stack assembly 10 is a rotary actuated head stack assembly which rotates as illustrated by arrow 16 to move heads 12 relative to discs 14 so that the heads may be selectively positioned over various data tracks on the discs 14 for retrieving pre-selected data or writing data to the discs 14. The head stack assembly 10 is actuated by a servo motor 18 which is shown diagrammatically in FIG. 1. Although the present invention is described in relation to a rotary actuated head stack assembly, it should be understood that the invention is not limited to a rotary actuated or any particular head stack assembly.

As shown in FIG. 1, the head stack assembly 10 includes an actuator housing 20, a pivot bearing bore 22, a plurality of actuator arms 24, a plurality of load beams 25 and a plurality of heads 12. The actuator housing 20 is rotatably supported relative to the discs 14 by the pivot bearing 22. The plurality of actuator arms 24 extend from the actuator housing 20 in spaced, stacked relation to support heads 12 in alignment with the discs 14. The heads 12 are coupled to the actuator arms 24 via the load beams 25.

The heads 12 of the head stack assembly 10 are normally biased to contact stationary discs 14 and are selectively lifted from discs 14 by an air bearing system which is actuated via rotation of discs 14. Load beams 25 connecting the heads 12 to the actuator arms 24 are flexible members which normally bias the heads 12 towards the surfaces of the discs 14 so that the heads normally contact the discs 14. Since load beams 25 are relatively flexible, rotation of discs 14 creates a hydrodynamic lifting force under heads 12 to lift the heads 12 from discs 14. In particular, the load beams 25 include opposed extended ends, one of said ends being coupled to an actuator arm 24 and another of said ends being coupled to a head 12.

Figure 1A:
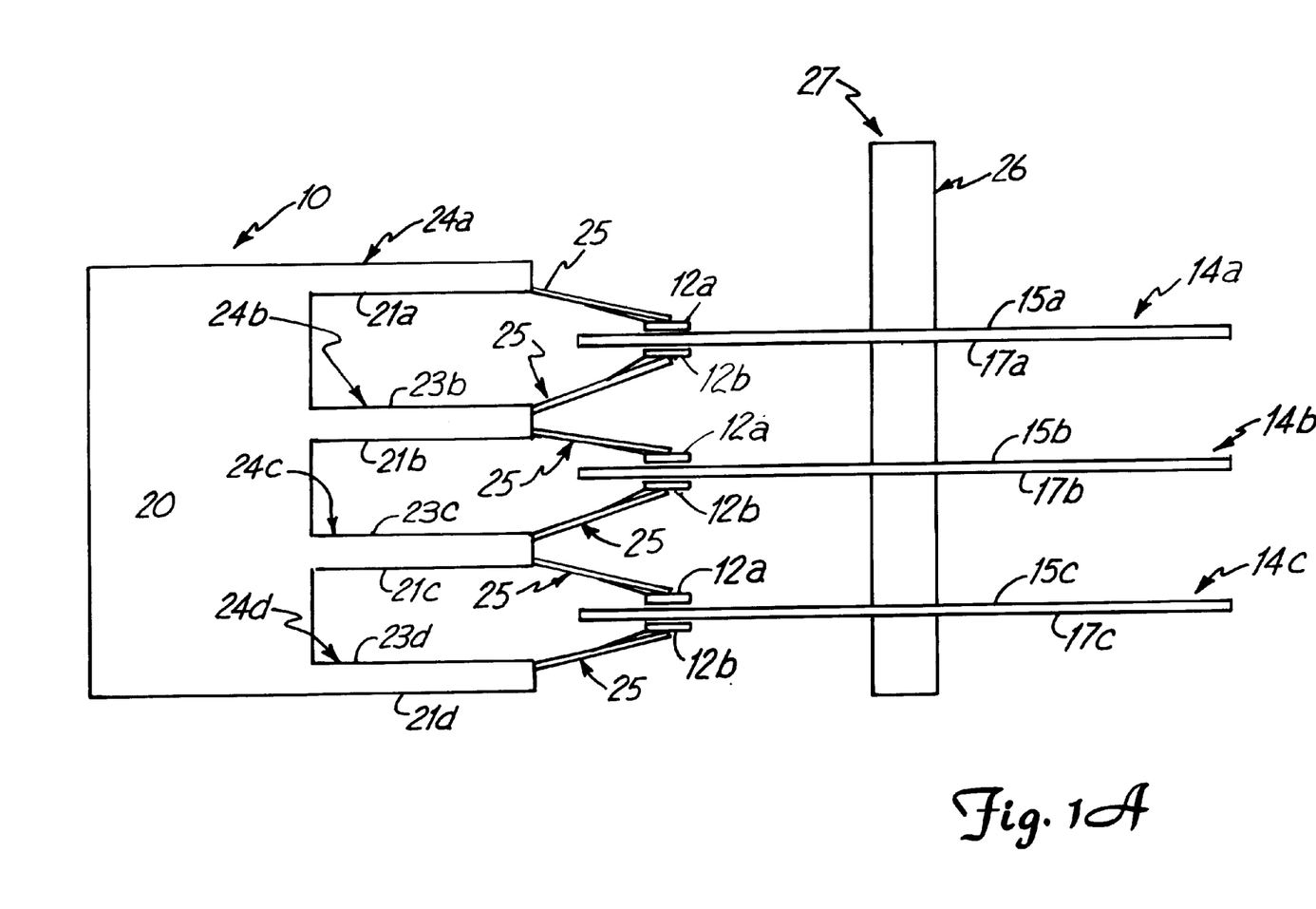
FIG. 1A is a diagrammatic view of the head stack assembly of FIG. 1 and a stacked disc assembly of a disc drive.

As shown in FIG. 1A, the disc drive includes a plurality of stacked discs 14a–c which are rotationally supported by spindle 26 to form a stacked disc assembly 27. Each disc 14a–c is preferably a dual sided disc and includes upper and lower disc surfaces 15a–c and 17a–c, respectively. The head stack assembly 10 includes a plurality of upper and lower heads 12a and 12b. The upper and lower heads 12a and 12b are supported relative to the upper and lower disc surfaces 15a–c and 17a–c of the stacked disc assembly 27 for reading and writing data on the upper and lower disc surfaces 15 and 17.

Each upper head 12a for reading an upper disc surface 15a–c is supported by a load beam 25 coupled to a lower surface 21a–c of the actuator arm 24 and a lower head 12b for reading a lower disc surface 17a–c is supported by a load beam 25 coupled to an upper surface 23b–d of an actuator arm 24 adjacent to the actuator arm 24 supporting the upper head 12a. In particular, as shown in FIG. 1A in reference to disc 14a, upper head 12a is coupled to a lower surface 21a of actuator arm 24a to read the upper surface 15a of disc 14a and lower head 12b is coupled to an upper surface 23b of adjacent actuator arm 24b to support lower head 12b in alignment with the lower surface 17a of disc 14a. The upper and lower heads 12a and 12b for reading and writing to discs 14b–c are similarly aligned as described for the upper and lower heads 12a and 12b for disc 14a. It should be understood that, although FIG. 1A includes three discs, the stacked disc assembly 27 may include any number of discs and the invention is not limited to the particular stacked disc assembly 27 shown.

Figure 1B:
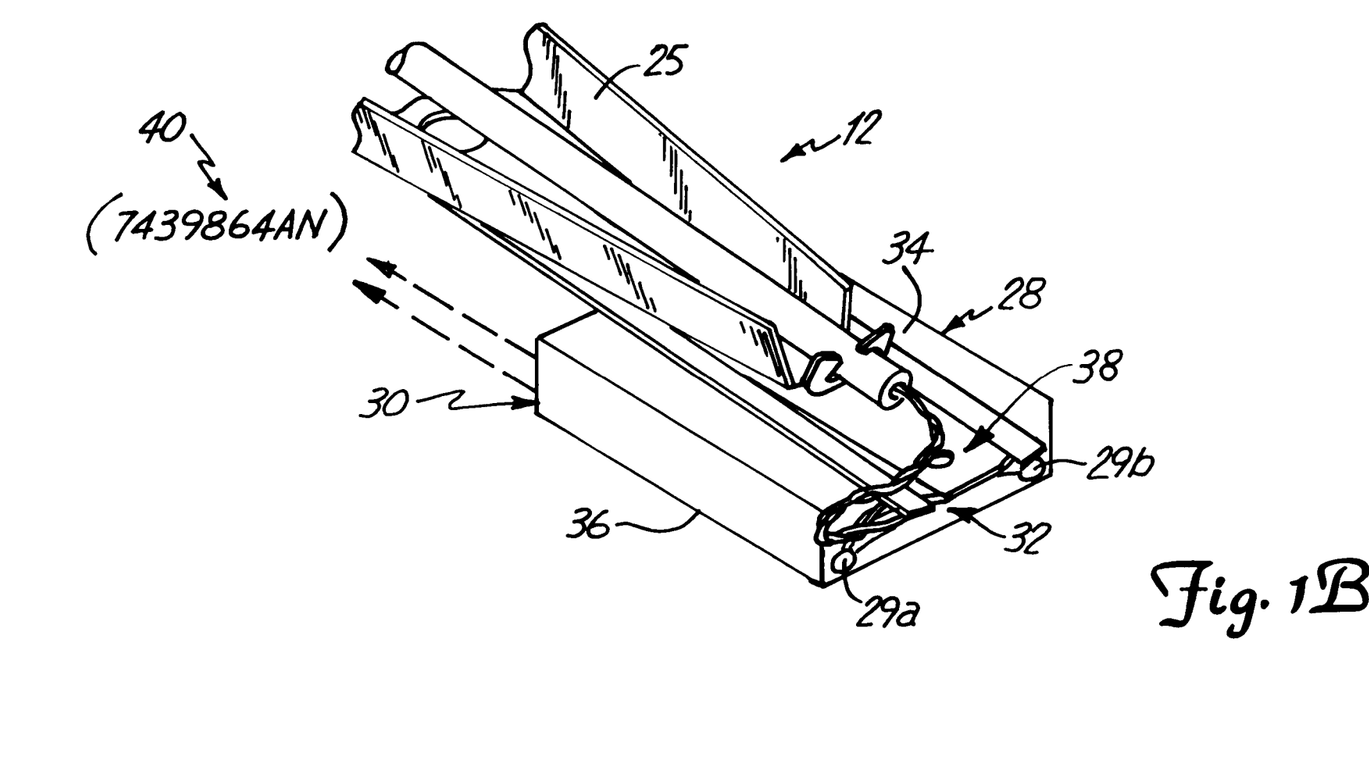
FIG. 1B is a detailed perspective view of a head of the head stack assembly shown in FIG. 1.

FIG. 1B is a detailed view of head 12. The head 12 includes a slider 28 which supports transducers 29a and 29b, one of which is used for reading and writing data to the magnetic surfaces of the disc 14. In particular, the slider 28 is formed of an elongated non-conductive member and includes a leading end 30, a trailing end 32, an attachment surface 34 and an air bearing surface 36 (not visible in FIG. 3). Transducers 29a and 29b are located on the trailing end 32 of the slider 28 of the head 12. Slider 28 is coupled to the load beam 26 via gimble spring 38 at the upper attachment surface 34 of the slider 28 to attach the head 12 to the head stack assembly 10.

The leading end 30 is aligned so that rotation of discs 14 (shown in phantom in FIG. 1) counterclockwise as illustrated by arrow 41 induces a hydrodynamic lifting force which acts on the leading edge 30 to cause the head 12 to lift and fly above the disc surface. Printed data 40 is located on the leading end 30 of the slider 28 thus defining a printed surface (not visible in FIG. 1B) on the leading end 30 of the slider 28. As shown in FIGS. 1 and 1A, load beam 25 of an upper head 12a is coupled to a lower surface 21 of an actuator arm 24 to align the air bearing surface 36 of the head 12a to face the upper surface 15 of discs 14. Load beam 25 of a lower head 12b is coupled to an upper surface 23 of an actuator arm 24 to align the air bearing surface 36 of the head 12b to face the lower surface 17 of discs 14.

Alphanumeric data 40 is included (typically etched during manufacture) on the leading end 30 of the slider 28 as shown in FIG. 1B to define the printed surface of the head 12. This printed data (such as serial number or product identification number) is used to track manufacture data (such as manufacture lot, date, assembly plant or other data) for the particular head. Thus, the printed surfaces of the heads 12 face inwardly toward the actuator housing 20 and are hidden from direct view. While printed data 40 may be recorded from a printed surface of a head 12 prior to assembly in a head stack assembly 10, it is also desirable to read such data from printed surfaces of heads 12 of an assembled head stack assembly 10.

Figure 2:
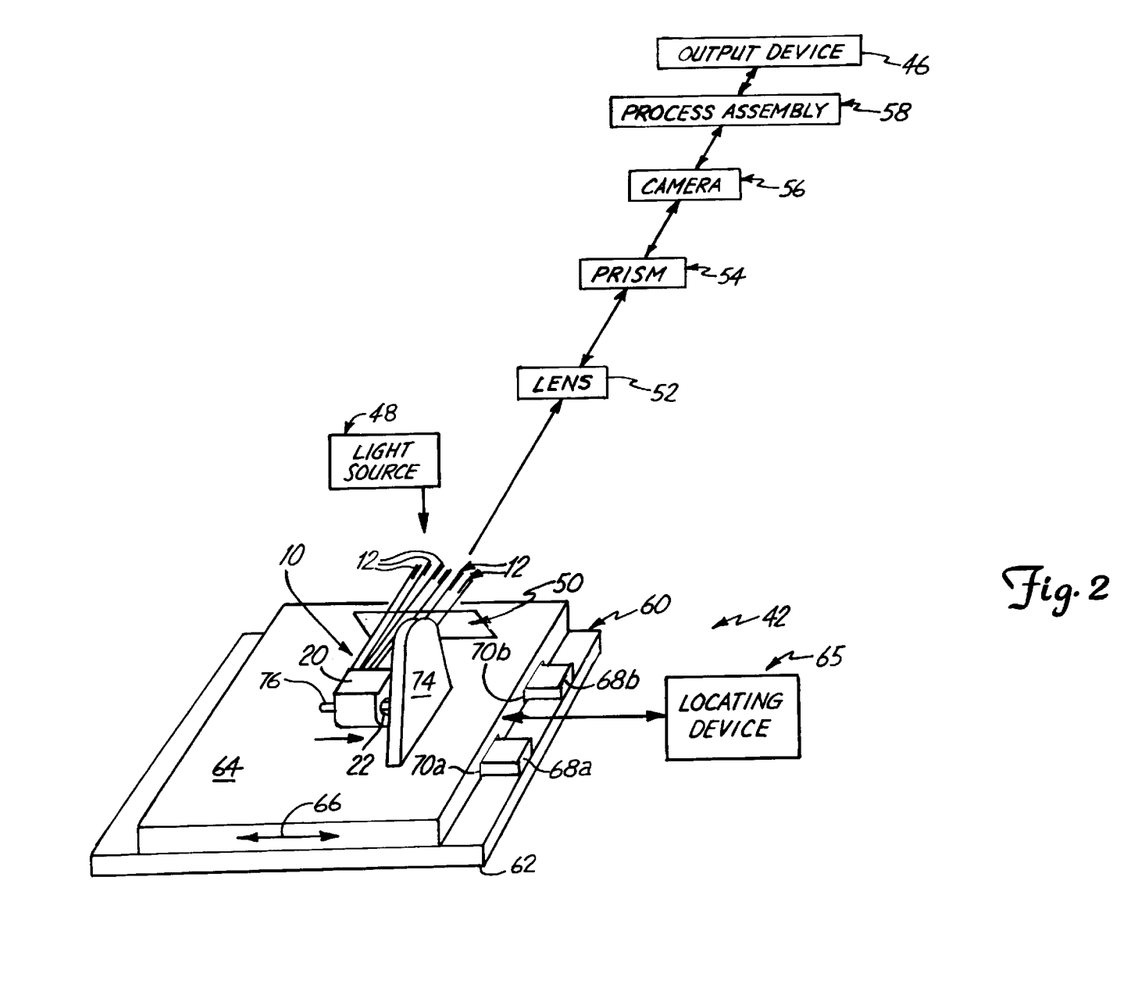
FIG. 2 is an illustrative view of an embodiment of the device for reading printed data from a head in a head stack assembly in accordance with the present invention.

Previously, data 40 could be read manually from the heads of an assembled head stack assembly 10. However, since the printed surfaces of the heads 12 of a head stack assembly 10 is hidden from direct view this process is time consuming, expensive and can potentially damage the heads 12 of the head stack assembly 10. FIG. 2 illustrates one embodiment of a head stack assembly reader apparatus 42 of the present invention. The head stack assembly reader apparatus 42 of the present invention shown in FIG. 2 includes an image detection assembly, an output device 46, and an illumination source 48 which are shown diagrammatically in FIG. 2. The image detection assembly is used to optically detect the printed data 40 on the heads 12 and output the data 40 of the heads 12 to the output device 46. Illumination source 48 is used to illuminate the printed surface so that the image detection assembly can detect the head data 40.

The image detection assembly shown in FIG. 2 includes a mirror 50, a lens 52, prism 54, a charge coupled device camera ("CCD camera") 56 and a processing assembly 58. The CCD camera 56 produces a digital video image of the optical image of the printed data 40 on the printed surfaces of the heads 12. The lens 52 is coupled with the CCD camera 56 to produce an enlarged optical image of the head data 40 as will be explained. Mirror 50 is included to optically direct the printed data 40 from the printed surface (leading end 30 of the head 12) for detection by the CCD camera 56. The mirror 50 and CCD camera 56 are aligned relative to one another and to the printed surface of a head 12 so that the printed data 40 may be detected. Head data 40 from the printed surface of the head 12 captured by the CCD camera 56 is output to the output device 46 for use. The illumination source 38 provides sufficient light to reflect an image of the printed data and to allow the CCD camera 46 to detect a reflected optical image of the head data 40.

As shown in FIG. 2, the head stack assembly 10 is supported via a head stack assembly support device 60. The head stack assembly support device 60 preferably includes a base 62 and a movable support platform 64 which is designed to move relative to the base 62 (as illustrated by arrow 66) via a locating device 65 (shown diagrammatically). In particular, the base 62 includes first and second ridges 68a and 68b which define a track along which grooves 70a and 70b of platform 64 are designed to move.

The movable platform 64 includes a head stack support. As shown in FIG. 2, the head stack support includes a post 74 and a support rod 76. The post 74 is mounted to the moveable platform 64. The rod 76 is supported by the post 74 and extends therefrom. The diameter of the rod 76 is sized to extend through the bore of the pivot bearing 22 of the head stack assembly 10 to removably support the head stack assembly 10 by sliding the bore of the pivot bearing 22 of the head stack assembly 10 over the support rod 76. The diameter of the rod 76 may be sized so that it can support a variety of different sized head stack assemblies.

In the embodiment described, the head stack assembly 10 is supported via the head stack assembly support device 60 in alignment with the CCD camera 56 such that the trailing ends 32 of the sliders 28 of the heads 12 face outwardly towards the CCD camera 56. Thus, the leading ends 30 (or printed surfaces) of the sliders 28 face away from the CCD camera 56.

As shown in FIG. 2, mirror 50 is coupled to the movable platform 64 and extends therefrom to support an extended portion of the head stack assembly 10 between the sliders 28 and the actuator housing 20. Preferably, mirror 50 extends from movable platform 64 at about an angle of 30 degrees off center from an axis of the camera 56 to direct an image of the head data 40 from the printed surface to the camera 56.

Thus, as shown, the mirror 50 directs the image of the printed data 40 on the printed surface (leading end 30 of the slider 28 facing away from the CCD camera 56) towards the CCD camera 56. Although a particular arrangement or preferred embodiment of the head stack support device 60, CCD camera 56 and mirror 50 is shown, other suitable arrangements may be used to position the head stack assembly 10 and CCD camera 56 to direct the image of the printed data on the printed surface of the head 12 to the CCD camera 56 so that the image can be detected by the CCD camera 56.

Figure 2A:
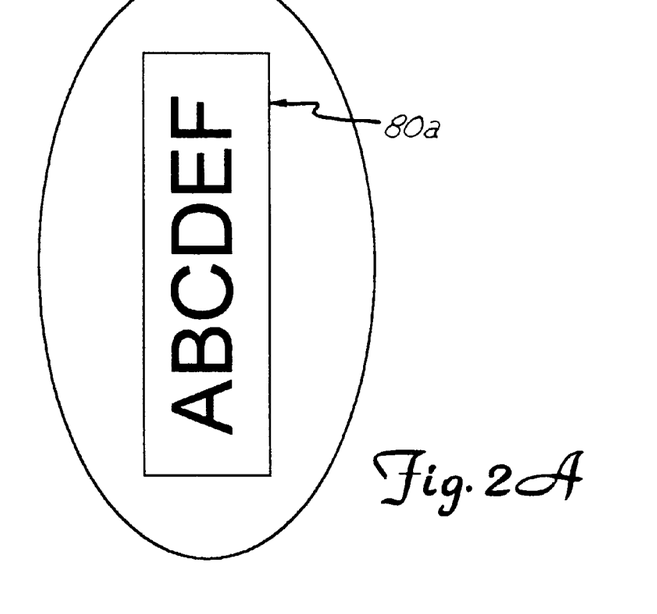
FIG. 2A is an illustrative view of an image of printed data projected from a printed surface of an upper head of a head stack assembly supported by the device of the present invention.
Figure 2B:
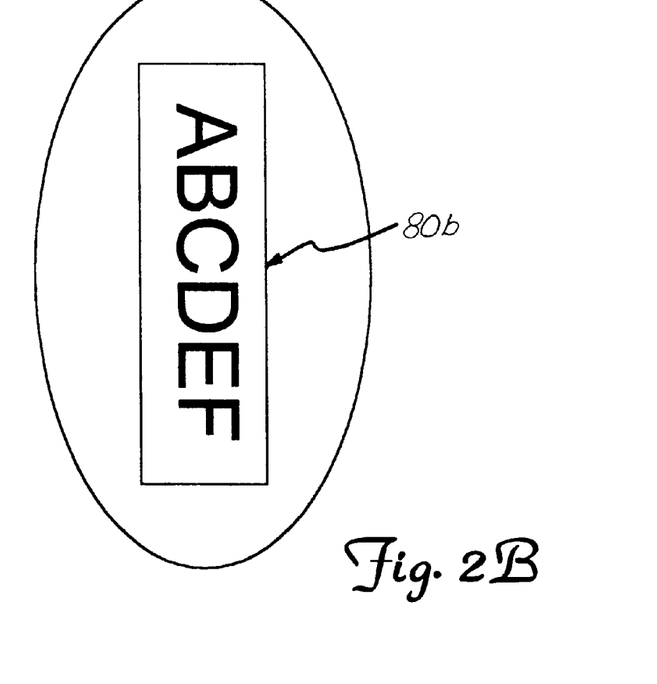
FIG. 2B is an illustrative view of an image of printed data projected from a printed surface of a lower head of a head stack assembly supported by the device of the present invention.
Figure 2C:
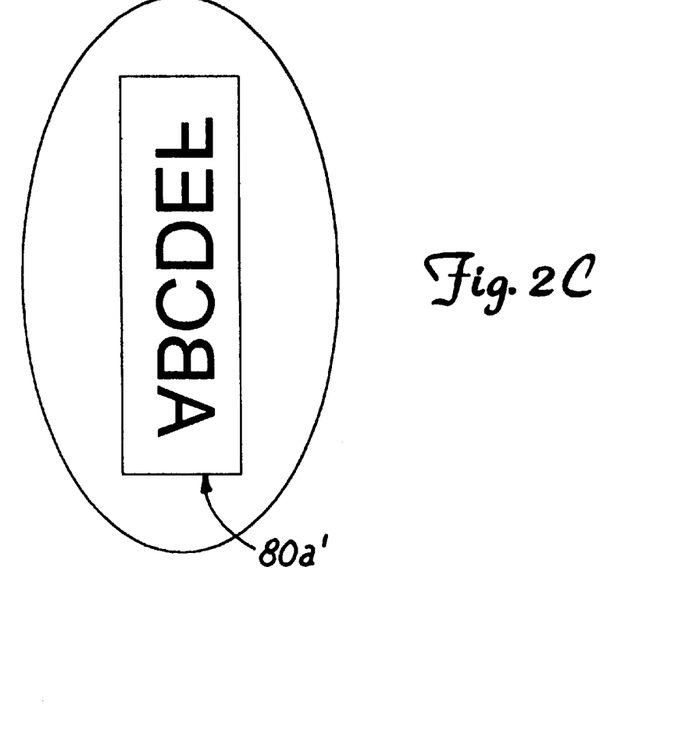
FIG. 2C is an illustrative view of a mirror image of the printed data from the upper head of a head stack assembly which is reflected from a reflection device to a camera of an image detection assembly of the present invention.
Figure 2D:
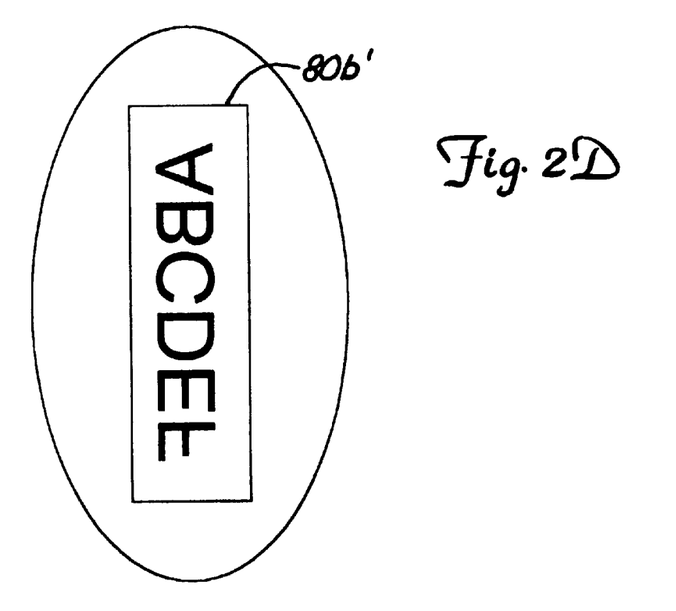
FIG. 2D is an illustrative view of a mirror image of the printed data from the lower head of a head stack assembly which is reflected from the reflection device to the camera of the image detection assembly of the present invention.

FIGS. 2A and 2B illustrate the images 80a and 80b of the printed data 40 of upper and lower heads 12a and 12b (for reading upper and lower disc surfaces 15 and 17) which face mirror 50. As shown, since upper head 12a is supported via load beam 25 coupled to the lower surface 21 of the actuator arm so that the air bearing surface 36 of the head 12a is aligned relative to the upper disc surface 15, the image 80a of the printed data of the upper head 12a is aligned in a first direction as shown in FIG. 2A. Since lower head 12b is supported via load beam 25 coupled to the upper surface 23 of the actuator arm so that the air bearing surface 36 of head 12b is aligned relative to the lower disc surface 17, (i.e., since lower head 12b is inverted relative to upper head 12a) the image 80b of the printed data on the lower head 12b is aligned in a second direction opposite to that of the first direction of the printed data on the upper head 12a FIGS. 2C–2D illustrate images 80a'–b' of upper and lower heads 12a and 12b after being reflected by mirror 50 to the CCD camera 56. As shown, images 80a'–80 b' shown in FIGS. 2C–2D are mirror images of the images 80a and 80b of FIGS. 2A–B. Thus, the image detection assembly includes prism 44 to invert the mirror images 80a' and 80b' illustrated in FIGS. 2C and 2D of upper and lower heads 12a and 12b so that the CCD camera 56 captures images 80a and 80b as illustrated in FIGS. 2A and 2B to output the images to an output device 46.

The CCD camera is preferably a Sony XC75 manufactured by Sony Corporation or other suitable CCD camera. The lens 42 is preferably a lens which provides a magnification of approximately 40 to 50 times the original image. The lens 42 may be a zoom lens commercially available from Navitar of Rochester, N.Y. or a telecentric lens. An iris is preferably included to provide an image of sufficient clarity and low distortion so that a clear and identifiable image of the printed data 40 is produced. The iris helps reduce distortion of the images 80a and 80b at the outer edges of the image. The illumination source 48 may be any light source which provides sufficient illumination such as a fiber optic light. It is also desirable that the light source be adjustable so that the illumination point of the light source may be adjusted so that the light may be precisely directed to illuminate the printed surface 40 of the heads 12.

The platform 64 of the head stack assembly support device 60 moves relative to base 62 via the locating device 65 for selectively positioning the plurality of upper and lower heads 12a and 12b of the head stack assembly 10 relative to the CCD camera 56 for reading sequential head data 40. Movement of platform 64 may be manual or may be automated by a self powered or other device.

An embodiment of a locating device 65 for manually moving the platform 64 to position each of the plurality of heads 12 at discrete increments may be a micrometer type device having a base, a moveable rod member and a graduated scale for moving the rod at defined intervals. Alternatively, the locating device 65 may be a self powered device which moves the platform at pre-defined increments based upon the construction of the head stack assembly 10 and placement of the heads 12 to automatically align heads 12a and 12b relative to the CCD camera 56.

The images of the printed data 40 captured by the CCD camera 56 are processed by the processing assembly 58 (computer) and are output to any number of types of output devices for recording the printed data 40. Such types of output devices 46 may include a display monitor, a magnetic storage media, or a printer device (such as a bar code printer coupled to a system for generating bar code labels).

Figure 3A:
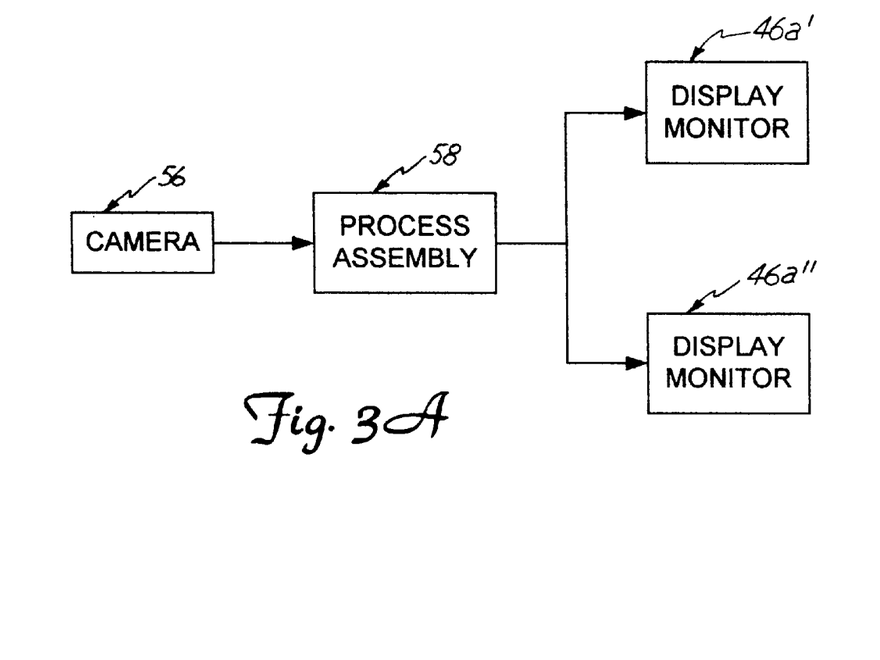
FIG. 3A is a diagrammatic view of an output assembly for outputting alphanumeric data from the heads of a head stack assembly.

FIG. 3A illustrates an output system for outputting head data 40 from the CCD camera 56 to display monitors 46a' and 46a" so that the head data 40 may be viewed by an operator. Dual display monitors 46a' and 46a" are included to display the dual orientated images 80a and 80b of the upper and lower heads 12a and 12b. In particular, monitor 46a' is coupled to the processing assembly 58 to display image 80a in an upright fashion and monitor 46a" is coupled to the processing assembly 58, but is upside down relative to monitor 46a' so that image 80b is displayed in an upright fashion. Thus, the operator may view either display monitor 46a' or 46a", depending upon the orientation of the head 12. Alternatively, a single monitor 46a may be used and the processing assembly 58 may be programmed to convert the head data 40 to display the data in a standard, upright format.

Figure 3B:
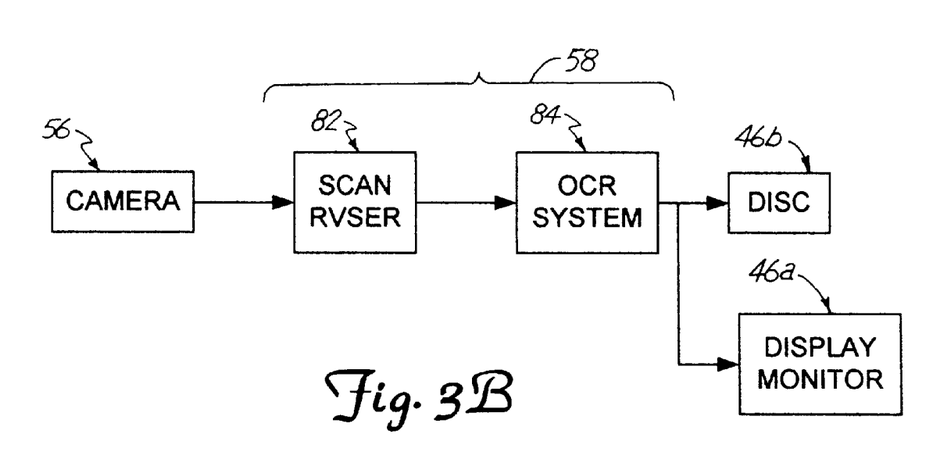
FIG. 3B is a diagrammatic view of an output assembly for outputting alphanumeric data from the heads of a head stack assembly.

Alternatively, as illustrated in FIG. 3B, data may be output from the CCD camera 56 to a magnetic storage media 46b. In such an embodiment, the processing assembly 58 includes a scan reverser system 82 and an optical character recognition ("OCR") system 84. The OCR system 84 includes an executable program which recognizes a video image of alphanumeric characters (detected by CCD camera 56) and converts the optical image to alphanumeric data which may be downloaded to the magnetic storage media 46b. The OCR system 84 must recognize the font of the optical image of the alphanumeric characters to convert the optical image (captured by the CCD camera 56) into alphanumeric data. A suitable OCR system 84 is commercially available from August Technology of Edina, Minn. As previously described, the images 80a and 80b (FIGS. 2A and 2B) are offset 180 degrees relative to one another. Accordingly, the scan reverser system 82 converts the optical image 80a or 80b of the alphanumeric characters of the head data 40 to a consistent format recognizable by the OCR system 84 to convert the optical images 80a and 80a to alphanumeric data. A scan reverser system 82 is available from Colorado Video, Inc. of Boulder, Colo. Such a scan reverser system 82 can also be utilized to eliminate prism 54.

Additionally, a display monitor 46a may be included in the system of FIG. 3B to both display the optical images 80a and 80b in addition to recording the alphanumeric data of images 80a and 80b on a magnetic storage media. The printed data of each head 12 of a head stack assembly 10 may preferably be recorded and stored in relation to the head stack assembly 10 to which the head data relates. Additionally, after the alphanumeric data for all of the heads of a particular head stack assembly 10 has been recorded, a bar code label may be printed for the head stack assembly 10 by a bar code printer. The bar code label is generated by the processing assembly 58 to correspond to the head data 40 for the heads 12 for the particular head stack assembly 10.

As explained, the system of the present invention provides a system for reading alphanumeric data 40 from heads 12 of a head stack assembly 10. This information may be read, recorded (relative to the head stack assembly 10) and accessed later to trace manufacturing information (such as lot number, etc.) for a failed head 12 of a head stack assembly 10.

Figure 4A:
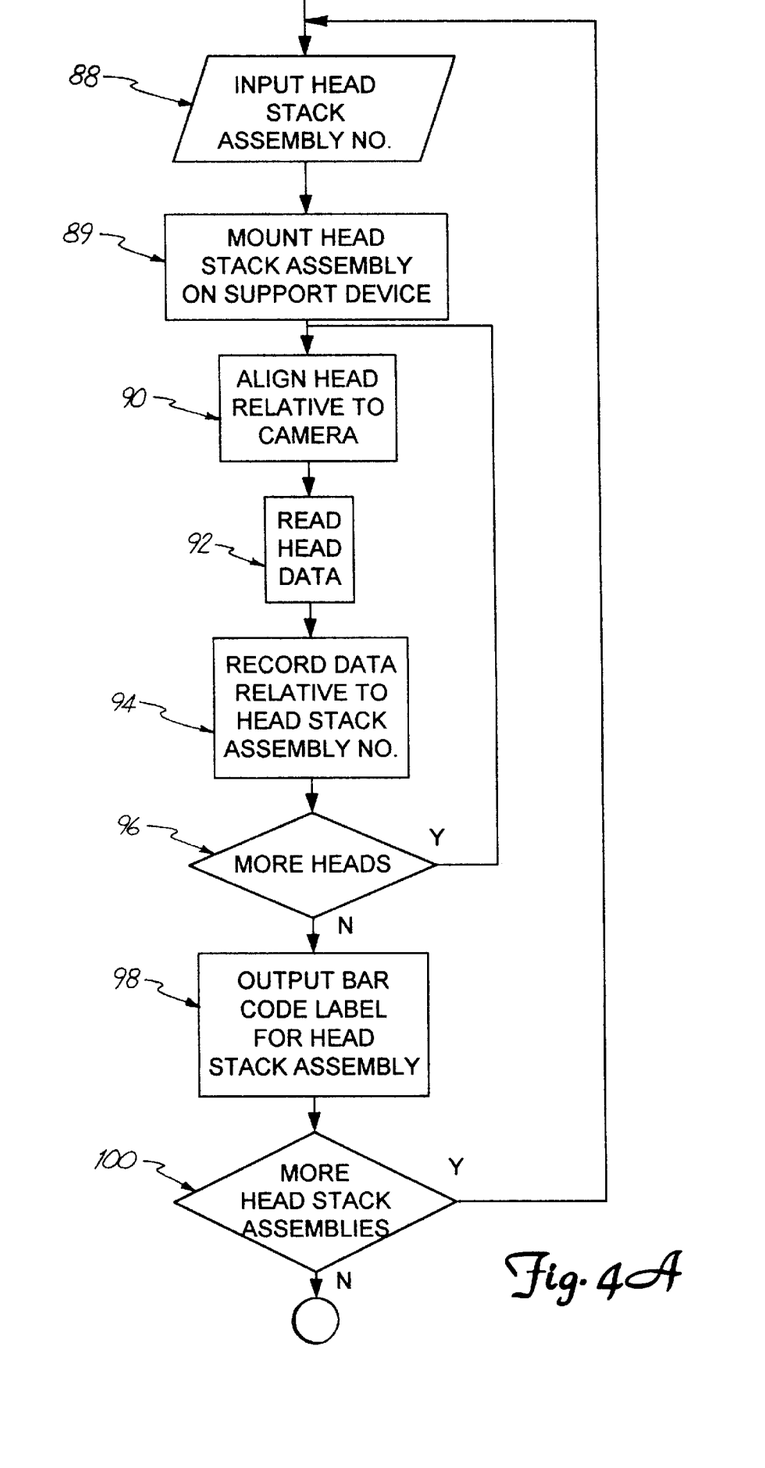
FIG. 4A is a flow chart illustrating the process for reading printed data from heads of a head stack assembly of the present invention.
Figure 4B:
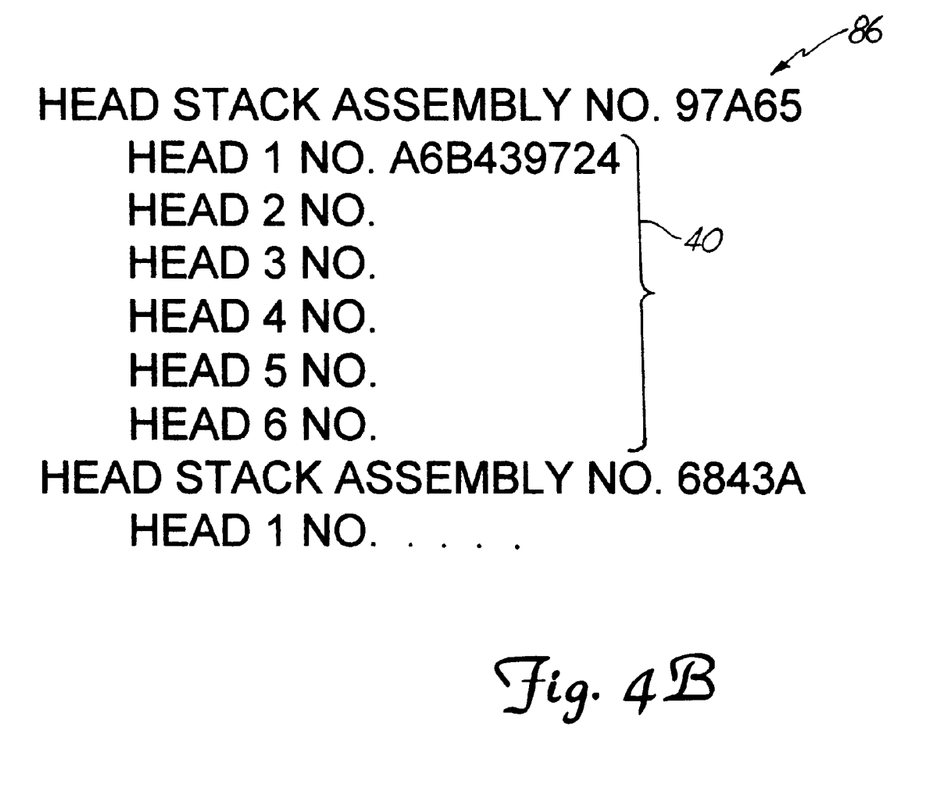
FIG. 4B is an illustrative view of the data collected for a head stack assembly and the individual heads of the head stack assembly.

FIG. 4A is a flow chart of a preferred system for reading and recording head data 40 for each head 12 of a head stack assembly 10. As shown in FIG. 4B, each head stack assembly may be identified by a part identification number or an alphanumeric series 86 which is input to the system as illustrated by block 88 of FIG. 4A. The head stack assembly 10 is then secured relative to the image detection assembly (via the head stack assembly support device 60) of the present invention as illustrated by block 89. Heads 12 of the head stack assembly 10 are positioned relative to the CCD camera 56 to read the printed data 40 from the heads 12 as illustrated by block 90 of FIG. 4A. The alphanumeric data 40 for each head 12 is output to an output device 46, as illustrated by block 92 and recorded relative to the particular head stack assembly as illustrated by block 94. This process is repeated for each head 12 of the head stack assembly 10 as illustrated by block 96.

The head data 40 for each head 12 is thus ascertained, recorded and archived relative to the part or serial number 86 of the head stack assembly 10 for use in tracking manufacture information for the heads 12 of a particular head stack assembly 10. After the head data has been read and entered for each head 12 of a head stack assembly 20, an output label (such as a bar code label) for the head stack assembly may be printed as illustrated by block 98. This process may be repeated as illustrated by block 100 for multiple head stack assemblies 10. The execution of the steps of FIG. 4A may done manually or the execution of the steps may be automated such that the processing assembly 58 is used to sequentially execute the steps.

If the steps of FIG. 4A are automated, the processing assembly 58 includes instructions for controlling operation of image detection assembly and a self powered locating device 65 for operating the head stack assembly support device 60. Thus, the processing assembly 58 sequentially positions the plurality of heads 12 of a head stack assembly 10 for detection by the CCD camera 56 and sequentially operates the CCD camera, the scan reverser system 82 and the OCR system 84 to sequentially read and record head data 40 for a particular head stack assembly 10.

Although the present invention has been described with reference to preferred embodiments, workers skilled in the art will recognize that changes may be made in form and detail without departing from the spirit and scope of the invention.

What is claimed is:

1. An assembly for reading printed data from heads in a head stack assembly of a disc drive, comprising:
    a head stack assembly support device for removably supporting a head stack assembly;
    an image detection assembly for detecting an image from a printed surface of heads in the head stack assembly, said image detection assembly including:
        a camera for reading printed data from an image surface;
        a reflection device spaced from the camera and image surface and positioned between the image surface and camera to project an image of the printed data to the reflection device and from the reflection device to the camera to optically detect the printed data; and
    an output device coupled to the camera to output the printed data.

2. The assembly of claim 1 wherein the camera is a charge coupled device.

3. The assembly of claim 1 wherein the output device is a display monitor.

4. The assembly of claim 1 wherein the output device is a digital storage media.

5. The assembly of claim 1 wherein the output device is a printer device.

6. The assembly of claim 1 wherein the image detection assembly includes:
    an illumination source for illuminating the printed surface of a head in the head stack assembly.

7. The assembly of claim 1 wherein the image detection assembly includes a lens for magnifying the image of printed data.

8. The assembly of claim 1 wherein the image detection assembly further includes a prism located relative to the camera and configured to invert a mirror image of the printed data directed to the camera by the reflection device.

9. The assembly of claim 3 wherein the output device includes first and second display monitors coupled to the output of the camera to display the optical images of printed data of upper and lower heads of a head stack assembly.

10. The assembly of claim 1 wherein an optical character recognition system is coupled to the output of the camera for converting an optical image of the camera to alphanumeric data.

11. The assembly of claim 1 wherein an image reverser is coupled to the camera for converting optical images of printed data of upper and lower heads of a head stack assembly to a standard format.

12. The assembly of claim 1 wherein the head stack assembly support device includes:
   a base;
   a platform, the platform being designed to be movably coupled relative to said base; and
   a support removably supporting a head stack assembly relative to said movable platform.

13. The assembly of claim 12 wherein the support includes:
   a support member sized to extend through an opening of an actuator housing of the head stack assembly to removably support the head stack assembly; and
   a post fixedly coupled to the platform to secure the support member relative to the platform, the support member being coupled to and supported by the post to align the heads of a head stack assembly relative to the camera.

14. The assembly of claim 12 wherein the reflection device is a mirror which extends from the platform of the head stack assembly support device and is positioned to support a portion of a head stack assembly removably supported relative to the platform.

15. The assembly of claim 12 and further including:
   a device for moving the platform of the head stack assembly support device relative to the base.

16. The assembly of claim 15 wherein the device for moving the platform of the head stack assembly is a manually operated device for incrementally moving the platform relative to the base.

17. The assembly of claim 15 wherein the device for moving the platform is a self powered device for moving and positioning the platform relative to the base.

18. The assembly of claim 17 wherein a controller is coupled to the self powered device and image detection assembly for operating the self powered device and image detection assembly for sequentially reading printed data from multiple heads of a head stack assembly.

19. A method for reading printed data from a head assembled in a head stack assembly comprising the steps of:
   providing an assembly for removably supporting a head stack assembly;
   providing an image detection assembly including a camera and a reflection device spaced from an image surface and the camera and positioned between the image surface and camera so that the printed data on the printed surface is projected to the reflection device and from the reflection device toward the camera to capture an optical image of the printed data;
   mounting a head stack assembly onto the head stack assembly support device to removably support the head stack assembly;
   detecting optical images of the printed data by the image detection assembly; and
   outputting the printed data to an output device.

20. The method of claim 19 further comprising the steps of:
   sequentially detecting optical images of the printed data of each head of a head stack assembly; and
   recording said printed data for each head of the head stack assembly.

21. The method of claim 19 further comprising the step of:
   converting the optical image of the printed data detected by the image detection assembly to alphanumeric data.

22. The method of claim 19 wherein each head stack assembly includes a part identification and further comprising the steps of:
   recording the part identification for each head stack assembly to correlate the alphanumeric data for each head to the head stack assembly by the part identification for the head stack assembly;
   recording the printed data for each head relative to the part identification for each head stack assembly; and
   printing a bar code label for a head stack assembly, said bar code label corresponding to a head stack assembly part identification.

23. An assembly for reading printed data from heads assembled in a head stack assembly of a disc drive, comprising:
   an image detection assembly for detecting printed data from a printed surface of heads of a head stack assembly supported relative to the image detection assembly, said image detection assembly including:
      a camera for recording an optical image of the printed data from an image surface;
      a reflection device spaced from the camera and image surface and between the camera and image surface to project an image of the printed data to the reflection device and from the reflection device to the camera to optically detect the printed data; and
   an output device coupled to the camera to output the printed data.

* * * * *